United States Patent
Everett et al.

(10) Patent No.: US 7,660,745 B2
(45) Date of Patent: Feb. 9, 2010

(54) SYSTEM AND METHOD FOR PRICE ANALYSIS AND NEGOTIATION

(75) Inventors: Matthew W. Everett, Basking Ridge, NJ (US); Supriya Mandava, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 994 days.

(21) Appl. No.: 11/128,641

(22) Filed: May 13, 2005

(65) Prior Publication Data
US 2006/0259370 A1  Nov. 16, 2006

(51) Int. Cl.
G06Q 30/00  (2006.01)
G06F 17/30  (2006.01)

(52) U.S. Cl. .......................................... 705/26; 705/27
(58) Field of Classification Search ............. 705/1, 705/26–27
See application file for complete search history.

(56) References Cited

U.S. PATENT DOCUMENTS

| | | | | |
|---|---|---|---|---|
| 7,133,848 B2 * | 11/2006 | Phillips et al. | ............... | 705/400 |
| 7,146,330 B1 * | 12/2006 | Alon et al. | ................... | 705/26 |
| 2002/0049645 A1 * | 4/2002 | Takahashi | .................... | 705/26 |
| 2002/0082849 A1 * | 6/2002 | Tenorio | ........................ | 705/1 |
| 2003/0130878 A1 * | 7/2003 | Kruk et al. | ..................... | 705/7 |
| 2003/0130901 A1 * | 7/2003 | Archibald et al. | ............. | 705/26 |
| 2005/0004819 A1 * | 1/2005 | Etzioni et al. | ................... | 705/5 |
| 2005/0289041 A1 * | 12/2005 | Chowdary | .................... | 705/37 |
| 2006/0173767 A1 * | 8/2006 | Hansen | ........................ | 705/35 |

OTHER PUBLICATIONS

"USDA: Cotton and Wool Yearbook". M2 Presswire, p. NA, Dec. 7, 1998. M2 Presswire-Dec. 7, 1998-USDA: Cotton and Wool Yearbook (C)1994-98 M2 Communications Ltd [recovered from Dialog on Sep. 14, 2009].*

* cited by examiner

Primary Examiner—Jeffrey A. Smith
Assistant Examiner—William J. Allen
(74) Attorney, Agent, or Firm—Priest & Goldstein, PLLC

(57) ABSTRACT

Systems and techniques for management and negotiation of prices of goods purchased from a vendor. Pricing information is collected by a purchaser. This information reflects factors influencing pricing of components used by a vendor and intended for use in products sold to the purchaser. The pricing information is processed to develop models that can be used to compute expected prices for components. The models and other available information are then used to compute target prices for components. When a price quotation for a product is received from a vendor, the price quotation is analyzed, and the quoted price is compared against an overall target price generated by identifying the components making up the product and adding the target prices for components and elements making up the product. If the quoted price exceeds the target price, the price quotation is rejected. Negotiations may then be undertaken to resolve the pricing differences.

14 Claims, 3 Drawing Sheets

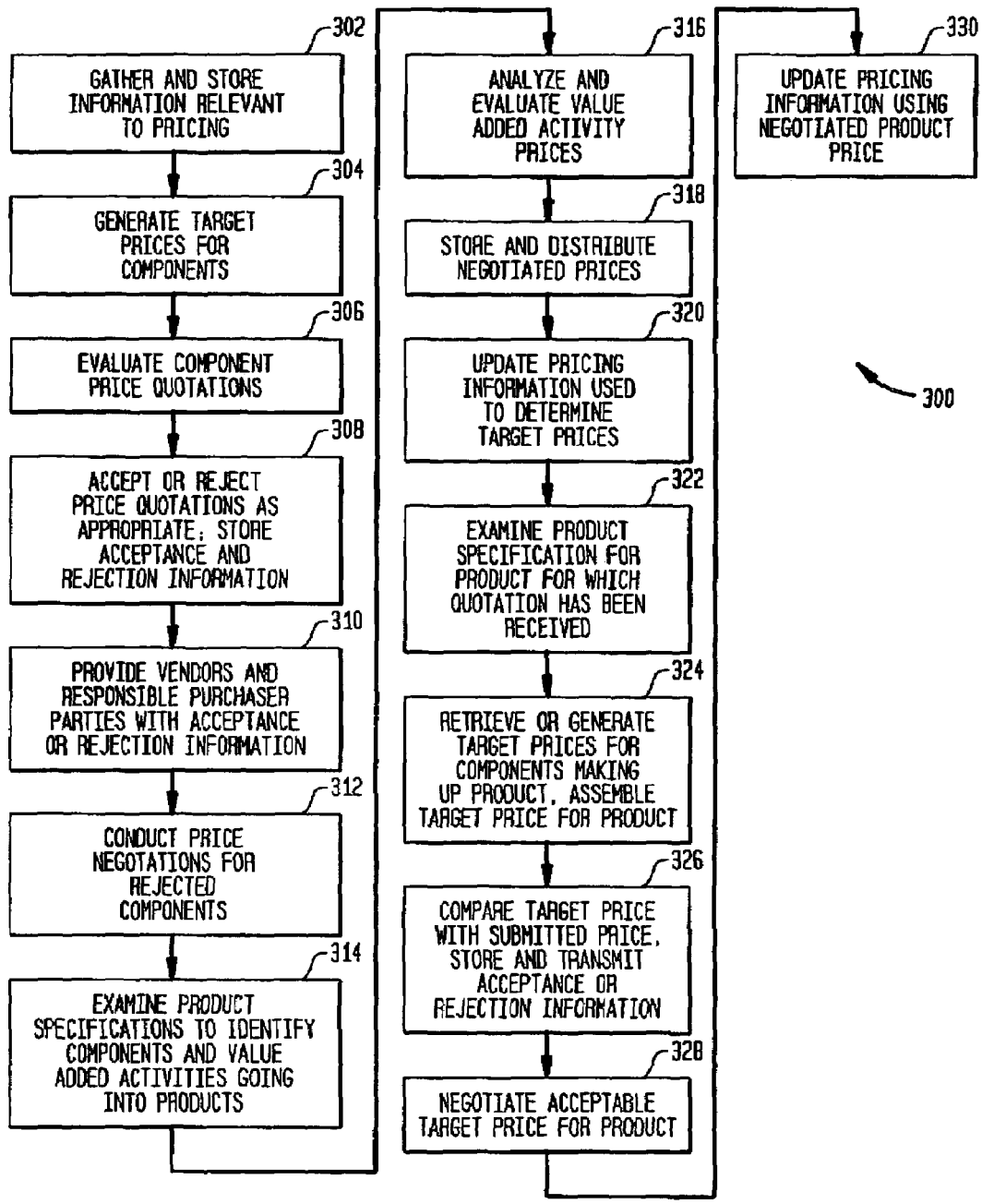

SYSTEM AND METHOD FOR PRICE ANALYSIS AND NEGOTIATION

FIELD OF THE INVENTION

The present invention relates generally to improved systems and techniques for negotiation of prices of products purchased from a supplier. More particularly, the invention relates to systems and techniques for receiving information relevant to determining appropriate pricing for components used in a product or products, analyzing the price information to compute target prices for the components and for products using the components, and accepting or rejecting price quotations received from a vendor based on a comparison of the price quotes with the target prices.

BACKGROUND OF THE INVENTION

Many sellers and providers of complex systems, such as data processing and communication systems, for example, purchase numerous products from manufacturers and suppliers for incorporation into the systems. The products purchased from the manufacturers and suppliers themselves frequently incorporate smaller components, and the cost of a product to the supplier naturally depends in significant part on the cumulative cost of the components making up the product. Price negotiations between a systems seller or other party that purchases components to be resold or incorporated into its own products, referred to hereinafter as a purchaser, and a manufacturer or supplier of a product used by the systems seller, referred to hereinafter as a vendor, are often heavily influenced by the cost of the components. Frequently, the price of a product negotiated between a purchaser and a vendor is based in large part on the total component cost to the vendor, supplemented by markups based on component cost, profit, and value added activities performed by the vendor. A vendor's price quote for a product in such cases typically includes a detailed breakdown of component prices. Markups are frequently understood to be a percentage of the component costs, with the percentage amount of the markup having been previously negotiated between the purchaser and the vendor. Because of the importance of component costs in determining pricing, purchasers have a strong interest in analyzing component costs to determine whether the price quotations by the vendor are based on acceptable prices for components.

Moreover, purchasers often have ongoing relationships with a limited number of large vendors who in turn purchase large numbers of components from their own suppliers. One particularly important category of vendor used by sellers of complex electronic systems is an electronic manufacturing services (EMS) provider. A purchaser often has an ongoing relationship with an EMS provider and receives periodic price quotations for all products and components offered for sale by the provider to the purchaser. The purchaser may conduct price negotiations with the provider to establish prices for a particular period. The purchaser may also receive quotes for individual products from an EMS provider, or from other vendors.

Considerable information is available relating to factors that influence acceptable prices for components. This information includes information relating to inventory levels, supply and demand, actual prices negotiated by the purchaser, and specific price targets established for the components.

In a large enterprise, particularly an enterprise purchasing products that may comprise very large numbers of components, information relating to various factors that influence component prices is typically distributed widely throughout the organization. Analysis of these factors and their use in determining appropriate component pricing as it relates to any particular product is therefore difficult.

SUMMARY OF THE INVENTION

Among its several aspects, the present invention recognizes that there exists a need for systems and techniques for consolidating and analyzing factors that influence prices of components in order to determine appropriate component pricing, and comparing expected prices based on these factors against price quotations received from suppliers.

In one exemplary embodiment, a system according to an aspect of the present invention is operated by or for a purchaser that typically purchases products from one or more vendors. The products include or use components that are purchased by the vendor or for which the vendor otherwise incurs costs, and which contribute to the price of the products sold by the vendor to the purchaser. The system includes a server receiving and processing data from one or more data sources. The data sources assemble information reflecting on factors that influence pricing of the components. The information may include information relating to purchases of the components, supply and demand information, technological advances, and other information influencing pricing of the components. The information may also include prices explicitly negotiated between the purchaser and a vendor, and any other available pricing information.

The pricing information is processed to develop models that can be used to compute expected, or target, prices for components. Models and additional information are then used to compute target prices for components. The target prices may be computed and stored, or may be computed when needed. When a price quotation for a product is received from a vendor, the price quotation is analyzed. The quoted price is compared against an overall target price generated by identifying the components making up the product and adding the target prices for components and elements making up the product. If the quoted price exceeds the target price, the price quotation is rejected and the vendor is notified of the rejection. Responsible parties associated with the purchaser are also notified of the rejection, allowing for negotiations to resolve the pricing differences. The results of the negotiation are used to update the pricing information.

A more complete understanding of the present invention, as well as further features and advantages, will be apparent from the following Detailed Description and the accompanying drawings.

BRIEF DESCRIPTION OF THE DRAWINGS

FIG. 3 illustrates a process of pricing analysis and management according to an aspect of the present invention.

DETAILED DESCRIPTION

The present invention will be described more fully hereinafter with reference to the accompanying drawings, in which several exemplary embodiments of the invention are shown. This invention may, however, be embodied in various forms and should not be construed as limited to the embodiments set forth herein.

Figure 1:
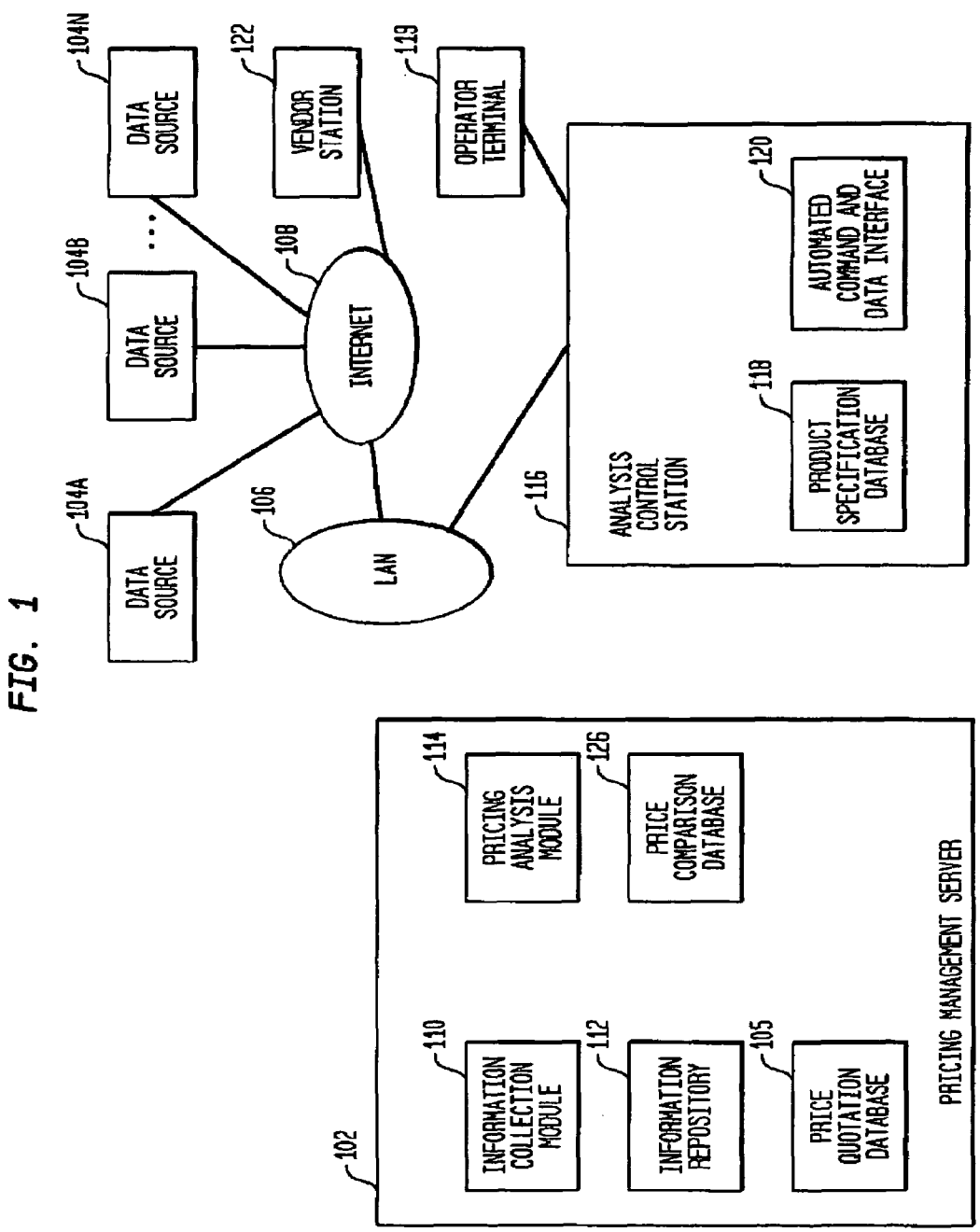
FIG. 1 illustrates a system for computing appropriate pricing and evaluating price quotations according to an aspect of the present invention.

FIG. 1 illustrates a system 100 for managing and analyzing expected component and product pricing according to an aspect of the present invention. The system 100 includes a pricing management server 102 communicating with a plurality of data sources 104A, . . . , 104N providing information relevant to pricing analysis.

One important source of data that may be collected is price quotation and transaction information relating to dealings between the purchaser and large vendors with which the purchaser has a close and ongoing relationship. One particularly important category of vendor, particularly in the context of creation, sales and installation of electronic systems to ultimate consumers, is an electronics manufacturing services (EMS) provider. An EMS provider may provide contract design, manufacturing and support services for an original equipment manufacturer (OEM) or other purchaser. Purchasers who regularly deal with EMS providers frequently have close relationships with EMS providers and receive reports from the providers. For example, a provider may supply a purchaser with periodic reports of component and value added costs for all products which the purchaser may order from the provider. The report may represent proposed prices for a particular cycle, such as a calendar quarter. The price quotations may be analyzed to determine if they are acceptable. An accepted price quotation for a component may be used as the price for the component during that cycle. If a price quotation is not accepted, negotiations may be conducted between the vendor and the purchaser to arrive at an acceptable price.

In addition to their use as a basis for acceptance or negotiation of component prices for a current cycle, a vendor's reports provide the purchaser with ongoing information that can be analyzed to give the purchaser an insight into the costs and cost trends experienced by the provider. The reports may be used as data that may be processed alone or along with other information in order to determine acceptable prices.

Providers may suitably load lists of price quotations to a purchaser's purchase control system 104A, and the server may retrieve such lists and other data from the purchase control system 104A. Alternatively, reports may be prepared by the provider and transmitted by any means desired. It will be recognized that ongoing relationships between vendors and purchasers are not limited to those between EMS providers and their customers, and that provisions can be made for similar regular sharing of information between any entities having a relationship for which such sharing would be useful. Prices received from the data source 104A may be stored in a price quotation database 105. The price quotations may be used as data in determining appropriate target prices for later reporting cycles and may also be used during the current cycle. Typically, a purchaser will have relationships with several EMS providers, all of whom are supply periodic price quotations to the purchaser, for example by loading data to the purchase control system 104A. Different EMS providers may use the same type of component in some of the products they furnish to the purchaser, and price quotations from different vendors will thus reflect multiple price quotations for these components. Price quotations from different EMS providers thus constitute a good source of data for use in determining appropriate prices. Suitably, a list of price quotations provided by a vendor identifies the vendor's own suppliers for components. A price quotation presented in the list may frequently represents the cost to the vendor of the component for which a price is quoted. In such cases, the price charged to the purchaser may be determined by the component cost together with an agreed upon markup amount.

Additional data sources may include sources such as departments or other organizational units of the purchaser by or for which the analysis is being performed, or data processing units serving those departments. As an example, the data source 104B may be an accounting server operated by a department of the enterprise operating the system 100. The department regularly purchases specified products and collects product information which is stored and processed using the data source 104B and is to be transferred to the server 102. In the normal ongoing activities of the department, the data source 104B serving the department receives product information identifying and describing products that are regularly or occasionally purchased, and tracks information useful in determining appropriate pricing of the products. The product information for a product may include a predefined product specification prepared to identify the elements of the product in order to help direct pricing analysis for the product. A product specification may suitably include identification of the components comprising the product, as well as assembly and value added activities required to produce the product.

Financial information relating to elements of the product is also gathered. Financial information may include overall prices paid for products and prices paid for components, either individually or as part of a product. Financial information may also include purchase information for each purchase of an item of interest, such as a product or component. The purchase information suitably includes the supplier of each item. For example, purchase information for a component may include identification of the supplier of the component, and purchase information for a product may include identification of the supplier of the product as well as identification of the supplier of each component of the product, provided that such information is available. Purchase information also includes the date of a purchase, so that the information will be more useful in correlating pricing with time and will be more useful in evaluating trends, such as pricing, supply, and demand trends.

Other data sources may include a data collection service 104C, providing data obtained through industry surveys, news and other information. For example, various data collection services may be available for tracking costs of commonly used components. Alternatively, services may be available for delivering news and other information from which pricing information can be extracted. Numerous additional data sources may be envisioned, and one data source may provide more than one category of information. The server 102 suitably communicates with the data sources 104A, . . . , 104N through a combination of a local area network 106 and the public Internet 108, to allow for secure and convenient communication between entities within the same enterprise and in locations near one another and to accommodate communication with remote and external entities.

The server 102 hosts an information collection module 110, an information repository 112 and a pricing analysis module 114. The information collection module 110 periodically surveys the data sources 104A, . . . , 104N, collects data from the sources 104A, . . . , 104N, and stores the data in the information repository 112.

The server 102 communicates with an analysis control station 116. The analysis control station allows for entry of commands and information used to direct pricing analysis performed by the system 100. The analysis control station 116 hosts a product specification database 118. The product specification database 118 stores design specifications for each product for which pricing analysis is to be performed. A design specification for a product identifies each component and value added activity used to produce the product.

The analysis control station 116 also includes an operator terminal 119, allowing for direct entry of data and commands. An operator may submit, for example, new or updated product specifications for products. Commands that may be submitted include requests for reports on pricing trends and costs for specified products and components or groups of products and components. The analysis control station 116 also includes an automated command and data interface 120, allowing for automatic submission of information and commands to the server 102. Information and commands may be submitted according to scripts, for example.

The server 102 performs evaluation of price quotations, for example by evaluating lists of quotation information retrieved from the purchase control system 104A. The pricing analysis module may evaluate the quoted price for each item on a list by comparing it against a corresponding target price. The pricing analysis module 114 accepts or rejects each target price as appropriate and passes acceptance or rejection information to the vendor and to responsible parties associated with the purchaser. In addition, the rejection information and the quoted and target prices are suitably stored in a price comparison database 126. The actual results of price negotiations may also be stored in the database 126, and the price quotation and negotiation results may be compiled as needed to provide insight into expenditures and savings resulting from price negotiations. Suitably, the price quotation and negotiation results are used to develop target prices for a subsequent price quotation and negotiation cycle. For example, if an EMS provider provides a list of price quotations once every quarter, the currently submitted prices are evaluated and negations are undertaken as needed to establish actual prices to be paid during the quarter. Once negotiations are complete, the results of the negotiations are useful to indicate appropriate pricing and information relating to the results of the negotiations is suitably stored and used as appropriate in determining target prices for the next and subsequent quarters. Selections relating to the format and presentation of information may be made using the analysis control station 116. For example, an operator may design a form using the terminal 119, or the automated command and data interface 120 may be used to define a set of parameters governing the automatic formatting and presentation of information.

The server 102 may also receive price quotations for products. For example, a vendor may use the vendor station 122 to submit a quotation for a specified product. In such a case, the pricing analysis module 114 compares the price quotation against target prices for the components comprising the product and for the product as a whole. The pricing analysis module 114 rejects the quoted price if it is higher than the target price. The rejection is reported to the vendor and to responsible parties and entities associated with the purchaser. For example, the rejection may be reported using the operator terminal 119. In addition, the rejection information and the quoted and target prices are suitably stored in a price comparison database 126. The actual results of price negotiations may also be stored in the database 126, and the price quotation and negotiation results may be compiled as needed to provide insight into expenditures and savings resulting from price negotiations.

A price quotation for a product typically includes a specification of the price of each component making up the product. The pricing analysis module 114 suitably retrieves or computes a target price for each component. In addition, target prices for value added activities may also be computed, or alternatively, previously computed target prices may be retrieved.

Once a target price for each component and value added activity has been computed or retrieved, the target prices for the components and value added activities are combined to generate an overall target price. The overall target price is suitably a sum of the target prices of the components and value added activities, but may also incorporate a requirement that the price of each component be at or below the target price for the component. If such a requirement is imposed, a price quotation will not meet the target if the price specified by the quotation for any component exceeds the target price, even if other components are priced below their target prices, leading to a total quoted price that is below the sum of the target prices for the components. The target prices for the overall product and for each component serve as a basis for negotiation. If the purchaser calculates a target price that is lower for the quoted price for a component, the purchaser may be able to negotiate so as to obtain the lower price for the component or to guide the vendor so as to be able to obtain a lower price from the vendor's own suppliers, without necessarily causing an increase in the vendor's other component costs or prices. Identifying target prices on a component by component basis thus provides information that can be used to obtain an overall reduction in price below an initially calculated overall target price for a product.

Figure 2:
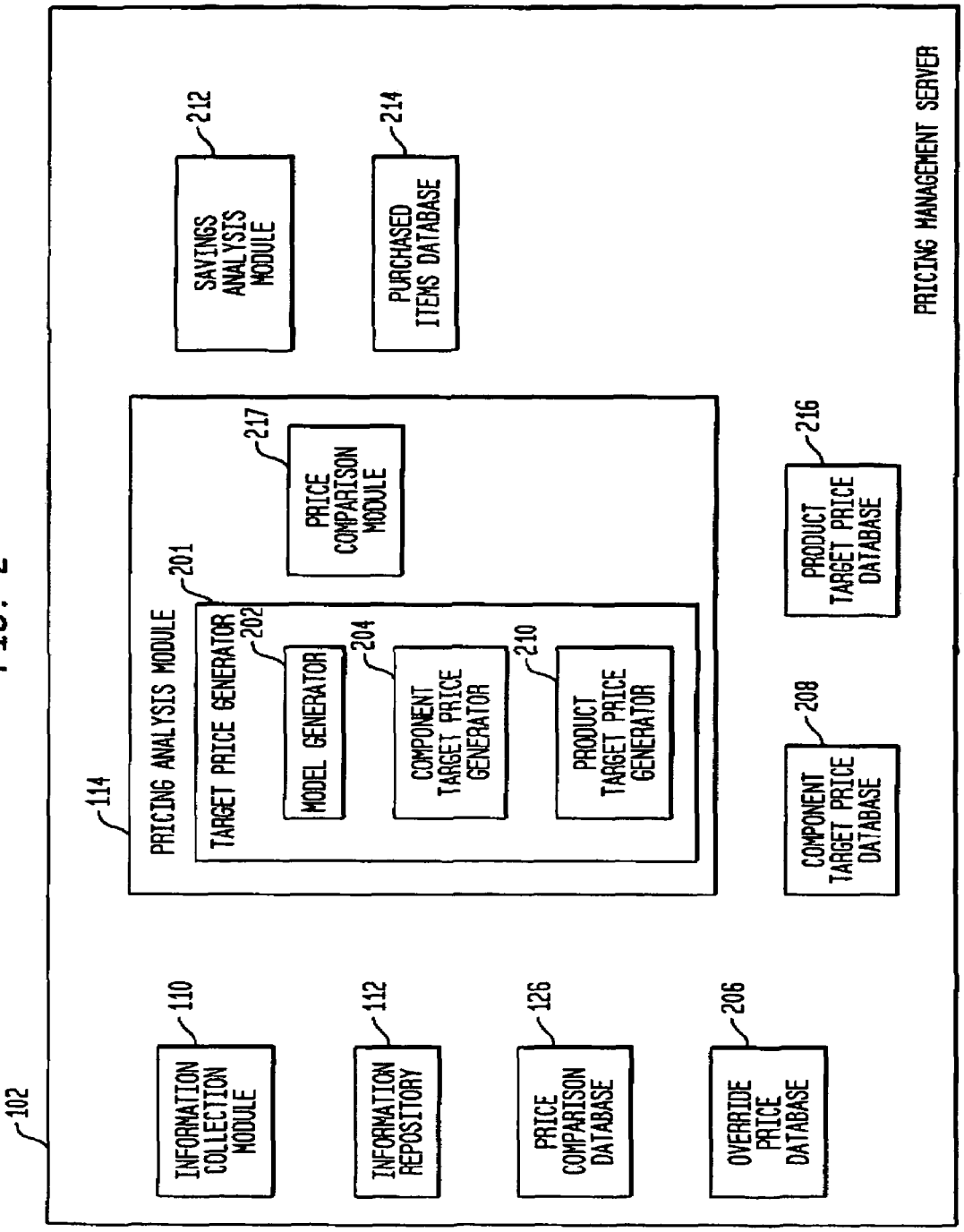
FIG. 2 illustrates a pricing management server according to an aspect of the present invention.

FIG. 2 illustrates additional details of the server 102, showing the information collection module 110, the information repository 112, the pricing analysis module 114 and the price comparison database 126. The pricing analysis module 114 includes a target price generator 201, which in turn includes a model generator 202 and a component target price generator 204. The model generator 202 uses the information stored in the information repository 112 to build pricing models that take into account the effects of factors influencing pricing, such as pricing trends, on the various components and other elements of each product. The component target price generator 204 computes a target price for each component for which a target price is desired. The target price generator 204 may also compute target prices for other product elements, such as value added activities. When a target price for a component is needed, the component target price generator 204 chooses an appropriate model or models and computes a price yielded by the selected model or models. The models may suitably be based on economic analyses, supply and demand information, and other appropriate data, and may be updated as needed to reflect changing circumstances.

The component target price generator 204 also has access to override prices. An override price for a component is a special price that can be selected in place of a calculated target price. For example, the purchaser may have explicitly negotiated prices with one or more vendors. In such cases, these explicitly negotiated prices are used as target prices instead of prices calculated using pricing models. Override prices are stored in an override price database 206. When a target price is to be generated for a component, the component target price generator 204 searches the database 206 for an override price. If an override price is present for a component, the override price may be chosen as the target price for component without a need to calculate a price using pricing models. Alternatively, pricing models may be used to calculate a provisional target price for a component and this provisional target price may be compared against a corresponding override price. If the provisional target price meets predefined criteria, for example, if the provisional target price is lower than the override target price, the provisional target price may be chosen and stored as the target price. As each component target price is established, it is stored in a component target price database 208.

The results of price quotations and negotiations are also taken into account in determining target prices for components. As noted above, an EMS may present price quotations for a list of components. These quotations, and the results of negotiations relating to the quotations, are used in determining appropriate target prices for future time periods.

To take an example, suppose that a purchaser is engaged in a long term relationship with a EMS provider that supplies data processing stations. The vendor periodically provides price quotations for all components used in the stations. The price quotation suitably appears in the form of the following table:

| Component | Component Cost |
|---|---|
| Grandserver Model 850 PC | $500 |
| Grandserver Model 2210 Monitor | $200 |
| SharpPrint 12B color laser printer | $400 |
| SharpPrint 1695 monochrome laser printer | $200 |
| Network Server Operating System Software | $400 |
| Network Administrator Operating System Software | $400 |
| Network Interface Card | $ 20 |
| 6 foot network cable | $ 10 |
| USB Cable | $  8 |
| On site delivery and assembly | $150 |

The component target price generator 204 examines data and factors relevant to determining acceptable pricing for the components in the list. Data may include quotations from other EMS providers for the same components in the same period and from the same and other EMS providers in the current period, as well as actual negotiated prices for the components in previous periods. Data also includes other quotations and purchases of components appearing in the list, industry trends, supply and demand information and similar data. The pricing analysis module 114 uses available data relating to pricing of the elements of the print station to develop pricing models for the various elements.

Pricing models may be based on price trends, overall supply and demand information for the specified components and similar components, technological advances and innovations, and other considerations relevant to determining appropriate pricing. For example, an exemplary model created by the pricing analysis module 114 may be based on a general pricing trend, for example a tendency for a price to decline based on improvements in technology. The model takes into account prevailing market considerations at a time of interest, and is refined by specific price data near a time of interest. The model yields an expected price of a component at a particular time of interest upon entry of supply and demand conditions prevailing at that time. The pricing analysis module 114 may develop models based on any number of considerations or combinations of considerations, with each model developed so as to produce the most accurate target price data possible. The pricing analysis module 114 may develop a model for each component or for appropriate groupings and classifications of components for which target pricing can be estimated using a single model.

Once appropriate models have been generated for calculating target prices for each component, the target prices can be calculated as required. Determination of a target price may be accomplished by choosing an appropriate model and calculating the target price using the model. If an override price or other alternative price is present for a particular component, this price may be chosen without a need to calculate a price using a model. As a further option, an alternative price may be compared with a price generated using a model and an appropriate choice may be made, for example choosing the lower price as the target price. As a still further alternative, a provisional target price may be submitted to a responsible party, for example an employee of the purchaser, and the party offered the opportunity to accept or to override the target price. Once appropriate target prices have been computed, they are assembled and stored. Typically, a purchaser will have relationships with multiple EMS providers and target prices will be developed for all components for all components for which price quotations are received. However, for simplicity of illustration in the present example, only a single EMS provider is discussed in detail, with a single list of components for which price quotations are provided and a corresponding list of target prices. The list of target prices corresponding to the above price quotation appears as follows:

| Component | Component Target Price |
|---|---|
| Grandserver Model 850 PC | $450 |
| Grandserver Model 2210 Monitor | $150 |
| SharpPrint 12B color laser printer | $300 |
| SharpPrint 1695 monochrome laser printer | $150 |
| Network Server Operating System Software | $200 |
| Network Administrator Operating System Software | $200 |
| Network Interface Card | $ 15 |
| 6 foot network cable | $  6 |
| USB Cable | $  5 |
| On site delivery and assembly | $150 |

Once the target prices have been developed, they are compared against the quoted prices. The quoted and target prices, and the discrepancies between target and quoted prices are stored in the price comparison database 126. If a quoted price for a component is higher than a corresponding target price, the quoted prices is rejected and a notification of the rejection is transmitted to the vendor. In the case of the EMS provider submitting the exemplary price quotation discussed here, the rejection notification is suitably submitted using the purchase control system 104A, from which it can be directed both to the vendor and to responsible parties associated with the purchaser. Negotiations may then be carried out between the purchaser and the vendor to resolve the pricing discrepancies.

Negotiations may be guided by savings analysis carried out using a savings analysis module 212. The savings analysis module 212 examines the quoted and target prices and compares the prices in order to determine potential savings. When negotiations are concluded, information indicating the actual savings achieved for each component is stored in the price comparison database.

The overall potential savings possible for a component may suitably be taken into account in directing negotiation efforts. For example, if a purchaser requires a large number of one type of component, negotiations to achieve savings for that component may constitute a good use of resources.

Therefore, the savings analysis module 212 has access to the product specification database 118, in order to identify which components are used in which products. The savings analysis module 212 also has access to sources of information indicating past and projected total purchases of each product and component. For example, one or more data sources such as the data sources 104A . . . 104N may provide such information, or such information may be collected and stored in a purchased items database 214. The number of units of each component expected to be purchased and the potential savings, that is, the discrepancy between the target price and the quoted price, over the total projected purchases, is estimated. Per component and overall potential savings information may be stored in the price comparison database 126 and furnished to responsible parties associated with the purchaser, for use in directing negotiation efforts.

In addition to generating target prices and evaluating price quotations for an overall list of components, it is also possible to develop target prices and evaluate price quotations for products. The target price generator may therefore also include a product target price generator 210 for use in generating a product target price for any product for which a product specification has been defined and for which a product target price is desired. The product target price generator 210 retrieves product data for a product from the product specification database 118 and generates a list of components comprising the product. The product target price generator 210 examines the price of each component and other element and assembles a target price record for the product. The target price record includes an overall price determined by adding the target price of each component, value added activity, or other pricing element going into the target price of the product. The target price record also includes the individual target price of each component or other element going into the overall price of the product, to allow for element by element comparisons between the target price of each element and the quoted price of the corresponding element as it appears in a price quotation. The target price record for each product is stored in a product target price database 212.

As an example, suppose that a product specification defines a print station. The print station consists of two printers, a print server for receiving print jobs and controlling the printers, a network interface to serve as an interface between the print server and a local area network, a network cable to connect the network interface to a local area network connector and two print universal serial bus (USB) cables to connect the printers to the print server. The print station also includes appropriate operating software. An exemplary product specification defining the print station is as follows:

| Component | Number |
|---|---|
| SharpPrint 2685 color laser printer | 1 |
| SharpPrint 1150 monochrome laser printer | 1 |
| Grandserver 850 PC | 1 |
| Network Interface Card | 1 |
| 6 foot network cable | 1 |
| USB cable | 2 |
| On site delivery and assembly | 1 |

The pricing analysis module 114 retrieves the design specification for the print station from the database 118 and examines the design specification to identify the elements of the print station. The pricing analysis module 114 retrieves target price information for each component making up the print station from the component target price database for which a target price is available. If target price information is not available for a component, the pricing analysis module 114 may generate and store target price information for the component in a manner similar to that described above in connection with generation of target prices in response to price quotations from EMS providers. In such a case, the pricing analysis module 114 examines the repository 112 for available data relating to pricing of the elements of the print station, develops pricing models for the various elements, uses the models to estimate pricing information, and refines price data generated using the models with additional data.

In the case of the exemplary print station discussed above, a target price record might be as follows:

| Component | Component Target Price |
|---|---|
| SharpPrint 2685 color laser printer(1) | $ 400 |
| SharpPrint 1150 monochrome laser printer(1) | $ 100 |
| Grandserver 850 PC(1) | $ 450 |
| Network Interface Card(1) | $ 6 |
| 6 foot network cable(1) | $ 3 |
| USB 2.0 cable(2) | $ 8 |
| On site delivery and assembly | $ 150 (negotiated price) |
| Overall Price | $1125 |

Returning now to FIG. 1, a vendor supplying a print station may submit a price quotation, for example using the vendor station 122. The quotation might appear as follows:

| Component | Quoted Component Price |
|---|---|
| SharpPrint 2685 color laser printer(1) | $ 450 |
| SharpPrint 1150 monochrome laser printer(1) | $ 125 |
| Grandserver 850 PC(1) | $ 450 |
| Network Interface Card(1) | $ 6 |
| 6 foot network cable(1) | $ 3 |
| USB 2.0 cable(2) | $ 8 |
| On site delivery and assembly | $ 150 (negotiated price) |
| Overall Price | $1200 |

The overall price exceeds the target price by $75, because the color and monochrome printers each exceed their target price. The price quotation is therefore rejected and a notice of the rejection, along with details of the rejection, is transmitted to the vendor using the vendor station 122. The rejection is also transmitted to the party responsible for negotiation with the vendor for the purchase of the product, using the department interface station 130. Negotiations may be conducted in order to revise the price quotation or to explain why the price quotation is appropriate. The target price provides the vendor with useful information that may be used in its negotiations with its own suppliers in order to obtain the component at the target price.

For example, a price may be rejected because a pricing trend reveals that a price reduction target, if the lowest cost provider for a component is not used, or if a quotation reflects a price increase when the increase is not justified by supply and demand. For example, if collected data shows excess supply for a component, a price quotation showing a price increase for the component would be rejected and the vendor would be required to explain the reason for the increase.

As noted above, the results of price comparisons, and the results of rejections and negotiations, are stored in the price comparison database 126. The data stored in the database 126 can be examined and processed to yield information describing expenditures and savings. The savings analysis module 212 may survey the database 126, either automatically according to predetermined parameters or in response to user inputs, to prepare price comparison reports. Comparisons can be performed for numerous different items and categories of items, allowing examination of comparison results for components, products, or related groupings of components or products. Examination can also be made for organizational divisions of a purchaser, showing expenditures and savings by department, for example. The savings analysis module 212 searches the database 126 for a designated item or category of items, gathers the price comparison information for the item or category of items and compiles expenditure and savings information for presentation.

Preferably, information is presented in such a way that a user viewing information related to one level of item or category can easily follow links in order to view information related to lower level items or categories. For example, a report may present information related to a system comprising numerous products which in turn comprise numerous components. The report preferably presents links so that a user viewing a report of expenditure and savings information for the system can easily view expenditure and savings information for products comprising the system and in turn for components comprising the products. A user viewing a report of expenditure and savings information for a component can view expenditure and savings information for the component over all products and systems and, if desired, may be able to view expenditure and savings information for products and systems in which the component is used.

FIG. 3 illustrates the steps of a process 300 of price evaluation and comparison according to an aspect of the present invention. The process 300 may be carried out using a system such as the system 100 and the various elements illustrated in FIGS. 1 and 2, but some or all of the process may be carried out in any of a number of additional ways, for example by information exchange and analysis by human employees of an organization.

At step 302, information relevant to appropriate pricing of components required by a purchaser is gathered and stored. Preferably, periodic price quotations from a plurality of vendors, such as comprehensive quotations submitted by a vendor for a list of components used in products supplied to the purchaser by that vendor, as well as individual component supplied to the purchaser by the vendor. Price quotations suitably include costs for hardware components, and may also include costs for value added activities performed in producing products. The price quotations may suitably be received in response requests for quotations by the purchaser, automatically according to a schedule, or using any other desirable technique. Additional relevant information is also received, for example, records of purchases by the purchaser, industry information, supply and demand information and projections, news relevant to pricing of components, and any other relevant information.

At step 304, the pricing information is used to generate target prices for each component. Target prices may be developed by analyzing the pricing information in order to develop models useful in predicting the response of component prices to various factors. Factors may include pricing trends, technological developments, supply and demand status, and other factors relevant to pricing of components. In order to determine pricing for a component, an appropriate model is chosen and an estimated price is determined using the model, based on the factors prevailing at the time the estimate is made. Additional data is then suitably used to refine the estimated price. For example, previous purchases, price quotations from vendors, previously negotiated prices and other data indicating specific prices paid may be used when possible or appropriate to supplement or replace price estimates generated using models. At step 306, component price quotations submitted by a vendor, for example an EMS provider, are evaluated by comparing them against corresponding target prices for the components. In the case of a submission by an EMS provider or other large vendor, the vendor and the purchaser may periodically negotiate component prices for a specified period, with sales of components and of products incorporating the components that are conducted during that period reflecting the negotiated prices. For EMS provides and other large vendors submitting proposed prices for lists of components, the comparison may suitably take place after submission of an overall list of price quotations and use of the price quotations as data in determination of target prices. It is possible to compare submitted price quotations against previously determined target prices, but quotations from a large vendor or several large vendors include information that can provide significant insights into appropriate pricing. For example, comparisons between quotations for the same component from different vendors will reveal whether or not one vendor is quoting a lower price, and if the vendors indicate the identities of their own suppliers, the supplier offering the lower price to a vendor can be identified.

At step 308, component price quotations at or below the corresponding target price are accepted and prices exceeding the target prices are rejected and the acceptance and rejection information is stored. At step 310, vendors and responsible parties associated with the purchaser are provided with acceptance and rejection information.

At step 312, price negotiations are conducted between the purchaser and the vendor to arrive at acceptable prices for components for which the submitted price quotations were rejected. Significant considerations in conducting negotiations include justifying a choice of supplier for a component other than the lowest cost supplier, achieving targeted price reductions and justifying price increases, particularly price increases in situations where excess supply is present. At step 314, product specifications for products furnished to the purchaser by the vendor are examined to identify components and value added activities used in creation of the products. At step 316, prices of value added activities are analyzed and negotiated. At step 318, negotiated prices for components and products are stored and distributed to vendors and to entities responsible for directing purchasing. At step 320, negotiated price information is used to update pricing information used to determine target prices.

It may also be desired to evaluate price quotations for products or groups of products. To evaluate a price quotation for a product, the process proceeds to optional steps 322-330. At step 322, a product specification for a product for which a price quotation has been received is examined to identify the components and value added activities making up the product. At step 324, target prices for the components making up the product are retrieved or generated and an overall target price for the product is assembled. At step 326, the target price for the product is compared with the submitted price quotation for the product and acceptance or rejection information is stored and transmitted to responsible parties. At step 328, price negotiations are conducted to arrive at an acceptable price for the product. At step 330, a negotiated product price is used to update pricing information.

While the present invention is disclosed in the context of several embodiments, it will be recognized that a wide variety of implementations may be employed by persons of ordinary skill in the art consistent with the above discussion and the claims which follow below.

We claim:

1. A system for price analysis and negotiation, comprising:
    a server for receiving and processing pricing data relating to components to be purchased, the server being operative to:
        receive and maintain pricing information relevant to determining appropriate pricing for a component;
        analyze the pricing information to generate a pricing model employing factors influencing appropriate pricing for the component as inputs;
        generate a target price for the component utilizing the pricing model; and
        analyze a price quotation received for the component by comparing the price quotation for the component against the target price for the component and rejecting the price quotation if it exceeds the target price for the component, wherein negotiated prices achieved after rejection of quoted prices are stored for use in generating models to be used in a future period.

2. The system of claim 1, wherein price quotations are received for components as part of a comprehensive list of price quotations for components supplied by a vendor, the list of price quotations identifying proposed prices for components during a period, and wherein the price quotations are stored for use in generating models to be used in a future period.

3. The system of claim 1, wherein the server communicates notifications of price rejections to a vendor providing the price quotations and to responsible parties associated with the purchaser.

4. The system of claim 3, wherein the server analyzes the pricing information to identify supply and demand information, pricing trends and technological factors influencing appropriate pricing and incorporates such information in the pricing models.

5. The system of claim 4, wherein the server analyzes price quotations and negotiated prices for past cycles to identify pricing trends.

6. The system of claim 5, wherein the server identifies potential and actual savings achieved by rejection and negotiation of component prices exceeding target prices.

7. The system of claim 6, wherein the server has access to a product specification database hosting product specifications, each product specification identifying components used in a product, and wherein the server analyzes the product specification information and purchase information for products to identify potential and actual savings resulting in negotiation of prices for particular components.

8. The system of claim 7, wherein the server is operative to generate a target price for a product by examining the design specification to identify components and value added activities comprising the product, to retrieve or generate target prices for each component and value added activity and to assemble an overall target price for the product by based on the target prices for the components and value added activities.

9. A method for price analysis and negotiation, comprising the steps of:
    receiving pricing information by a server relevant to determining appropriate pricing for components to be purchased and maintaining the pricing information in storage accessible to the server;
    controlling the server to generate one or more pricing models based at least in part on the pricing information, each pricing model being applicable to one or more of the components;
    utilizing the server to select a pricing model applicable to a component;
    utilizing the server to select factors influencing appropriate pricing for the component as inputs to the selected pricing model;
    generating a target price for the component based on the inputs; and
    utilizing the server to analyze price quotations received for components by comparing the price quotations for a component against corresponding target prices for the components and rejecting a price quotation if it exceeds the target price for the component, wherein negotiated prices achieved after rejection of quoted prices are stored for use in generating models to be used in a future period.

10. The method of claim 9, wherein the step of carrying out communications to receive pricing information includes receiving and maintaining periodic price quotations from one or more vendors, the periodic price quotations comprising comprehensive lists of proposed prices for purchases of components during a purchasing cycle, and wherein the price quotations for a current cycle are used in computing target prices for a future cycle.

11. The method of claim 9, wherein the pricing information used to create the pricing models includes supply and demand information, pricing trends, and technological factors influencing appropriate pricing.

12. The method of claim 11, creation of the pricing models includes analyzing price quotations and negotiated prices for past periods in order to identify pricing trends.

13. The system of claim 12, further comprising controlling the server to identify potential and actual savings achieved by rejection and negotiation of component prices exceeding target prices.

14. The method of claim 13, wherein controlling the server to identifying potential and actual savings includes controlling the server to analyze product specification and product purchase information to identify component purchases and wherein overall component purchases for different components are taken into account in identifying actual and potential savings resulting from price rejection and negotiation.

* * * * *

UNITED STATES PATENT AND TRADEMARK OFFICE
CERTIFICATE OF CORRECTION

PATENT NO. : 7,660,745 B2 Page 1 of 1
APPLICATION NO. : 11/128641
DATED : February 9, 2010
INVENTOR(S) : Everett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1307 days.

Signed and Sealed this

Twenty-eighth Day of December, 2010

David J. Kappos
*Director of the United States Patent and Trademark Office*